United States Patent Office 2,807,294
Patented Sept. 24, 1957

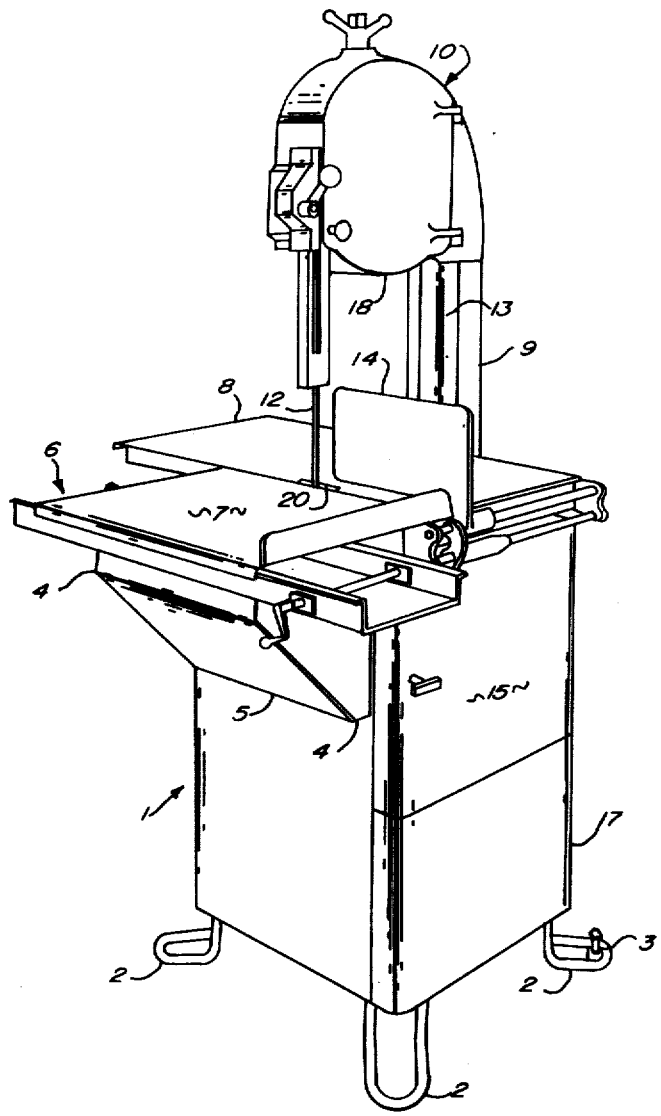
Fig. I
INVENTOR.
JAMES D. BROWN

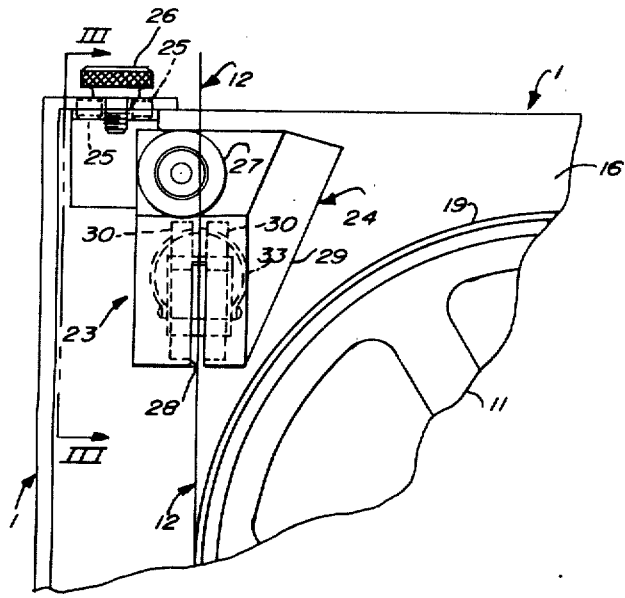
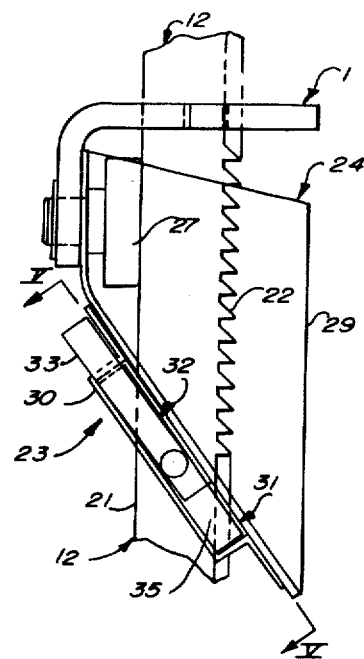
Fig. II        Fig. III
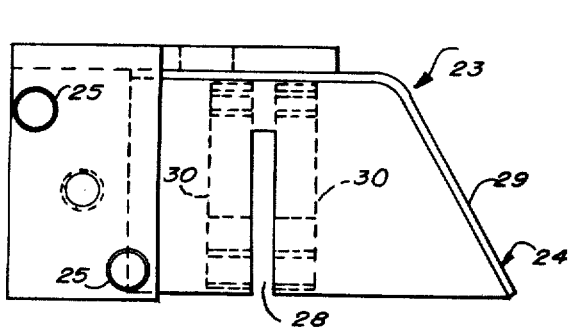
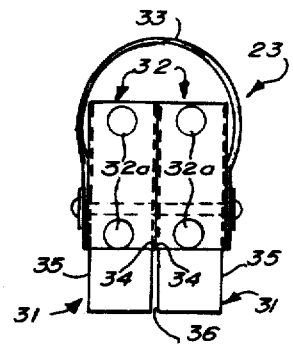
Fig. IV        Fig. V
INVENTOR.
JAMES D. BROWN

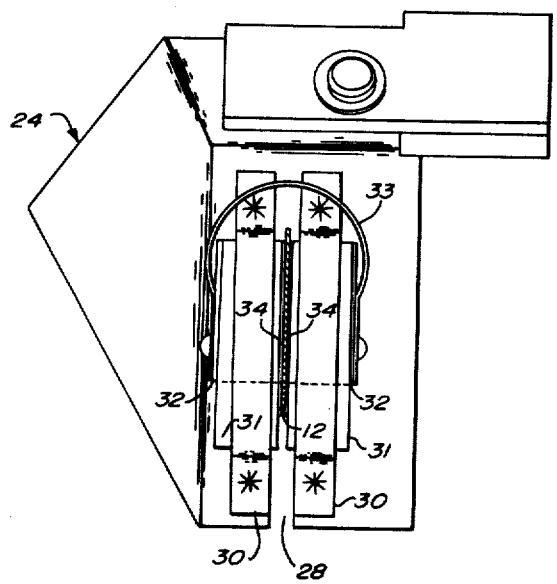
Fig. VI

2,807,294

BAND SAW BLADE SCRAPER

James D. Brown, Toledo, Ohio, assignor to Toledo Scale Company, Toledo, Ohio, a corporation of New Jersey Application October 10, 1955, Serial No. 539,361

4 Claims. (Cl. 143—158)

This invention relates to meat cutting band saws and particularly to a cleaning unit for band saw blades.

Heretofore, it has been the practice to provide scrapers for cleaning both lateral surfaces of the web of a meat cutting band saw blade. Such scrapers push waste material from the web into the teeth on the blade helping to cause gobs of material to build up on the teeth, which gobs are projected by centrifugal force into space by the moving saw blade at various points along its path of travel. This requires that the band saw machine along the entire path of movement of the saw blade be frequently cleaned adding materially to the labor cost of maintenance. Centrifugal force alone never completely frees the teeth of the gobs of waste material which keep building up as long as the saw is operated. Apparently, the waste material is in the form of fibrous meat shreds tightly wrapped around the teeth.

The principal object of this invention is to provide, in a meat cutting band saw, a blade cleaning unit for cleaning both the web and the teeth of the band saw blade.

Another object of the invention is to provide, in a meat cutting band saw, means for shielding the felly of a blade moving wheel from waste material falling thereupon and a pair of resiliently biased scrapers and a pair of resiliently biased deflectors carried by said shielding means for cleaning both the web and the teeth of the band saw blade.

More specific objects and advantages are apparent from the following description of a preferred embodiment of the invention.

According to the general features of the invention, a meat cutting band saw is provided with a shield that is mounted along the path of movement of the band saw blade and that protects the felly of a blade moving wheel from waste material falling thereupon. A pair of resiliently biased deflectors are mounted on the shield one on each side of the blade to be laterally slidable toward and away from the sides of the blade and a web scraper is fixed to each deflector. A resilient member connects the deflector and the scrapers to maintain at least the scrapers in contact with the web of the blade and to maintain an extended portion of each deflector closely adjacent teeth on the saw blade. The scrapers clean the web of the blade and the extended portions of the deflectors intercept and deflect waste material protruding from the teeth away from the teeth into one small area in the machine from where it may be easily removed.

A preferred embodiment of the invention is illustrated in the accompanying drawings:

In the drawings:

Figure I is a perspective view of a meat cutting band saw embodying the invention.

Figure II is an enlarged elevational view of the interior of the lower part of the band saw, parts being broken away and certain adjuncts being removed.

Figure III is an enlarged elevational view as seen from the line III—III of Figure II looking in the direction indicated by the arrows.

Figure IV is a fragmentary plan view of the cleaning unit shown in Figure III.

Figure V is an elevatiotal view as seen from the line V—V of Figure III looking in the direction indicated by the arrows.

Figure VI is an elevational view as seen from a position to the left of Figure III looking in the direction opposite to that indicated by the arrows of line V—V of Figure III.

These specific figures and the accompanying description are intended merely to illustrate the invention and not to limit its scope.

The meat cutting band saw generally illustrated in Figure I has a base housing 1 erected on four short legs 2 two of which have leveling nuts 3 parallel with the bottom surfaces of the legs. Forwardly extending supporting bracket members 4, interconnected by means of a plate 5, are fixed to the housing 1 and carry a pair of tracks 6 on which a movable table 7 is mounted to reciprocate. The top of the base housing 1 is formed by a stationary table 8 which lies in the same plane as the movable table 7 forming with the movable table a working surface for handling meat to be cut.

At the rear center portion of the base housing 1 there is erected a hollow vertically upstanding column 9 atop which is located a saw wheel housing 10. A lower saw wheel 11 (Figure II) is rotatably mounted in the base housing 1 and an identical upper saw wheel (not shown) is rotatably mounted in the saw wheel housing 10. A continuous band saw blade 12 runs on the raw wheels passing upwardly near the outer front surface of the colunm 9 and downwardly across a throat formed between the underside of the saw wheel housing 10 and the stationary table 8. The rearward stretch of the band saw blade 12 is enclosed by a saw guard 13 attached to the column 9. A driving motor (not shown) is mounted in the base housing 1 and is drivingly connected to the lower saw wheel 11 by a drive belt (not shown). A thickness gauge plate 14 is mounted for fore and aft movement along the right hand side of the stationary table 8 back of the cutting plane of the blade 12 so that by setting the position of the gauge plate relative to the blade slices of meat of desired thickness may be cut.

The base housing 1 is constructed of sheet metal sections welded into a rectilinear hollow body. An upper side of the base housing 1 is closed by an access door 15 the opening of which gives access to the interior of the base housing 1 which is compartmented. An upper compartment 16 (Figure II) is provided for the lower saw wheel 11 and a lower compartment 17 is provided for the driving motor and its mounting means.

The saw wheel housing 10 is provided with a suitable access door 18 so as to permit ready access to the interior for the operations of removing and replacement of the band saw blade 12 and for ready cleaning of the saw wheel and the housing. The upper and lower saw wheels are provided upon their outer peripheries with shallow flanges 19 against which flanges the rear edge of the band saw 12 may bear.

Heretofore, after the downwardly running saw blade 12 passed through meat on the tables 7 and 8 and then through the slot of a guide 20, it was partially cleaned by ordinary scrapers which cleaned only the web 21 of the blade. Such scrapers, of course, may not be permitted to touch the teeth 22 of the blade and served to push waste material from the web into the teeth helping to cause gobs of waste material to build up on the teeth, which gobs were projected by centrifugal force into space by the moving saw blade at various points along its path of travel. This required the band saw machine, even the saw wheel housing 10, to be frequently cleaned.

Such conditions have been greatly improved, according to the invention, by mounting a blade cleaning unit 23 along the path of travel of the saw blade 12. The cleaning unit 23 includes a shield 24 located relative to the housing 1 by means of a pair of locating pins 25, which cooperate with horizontally spaced holes in the housing 1, and held in place on the housing by means of a thumb screw 26. The shield 24 is provided with a thrust bearing 27 against which the back edge of the blade 12 bears, a slot 28 through which the blade passes which slot is wide enough to permit sidewise movement of the blade, and an apron 29 extending a distance sufficient to canopy the felly of the blade moving wheel 11 from falling shreds of meat projected into space in the cutting operation or by the various parts of the cleaning unit 23.

A pair of spaced guides 30 are fixed, as by welding (Figure VI), one at each side of the slot 28 and to the underneath side of the shield 24 which guides a pair of deflectors 31 are mounted one on each side of the blade 12 to be laterally slidable toward and away from the sides of the blade. Each deflector 31 has a thin plate or scraper 32 attached thereto by means of rivets 32a (Figure V). A U-shaped resilient member 33 extends around the back of the blade and is arranged to maintain at least the scrapers 32 in constant contact with the sides of the blade even during sidewise movement of the blade. That is, the edges of the scrapers 32 which contact the web 21 of the blade may be flush with the corresponding edges of the deflectors 31 or as shown in Figures V and VI the scrapers may have overhanging portions 34 which scrape the web and hold the deflectors out of contact with the blade. Any portions of the scrapers 32 and the deflectors 31 which contact the web must, of course, not touch the teeth 22 of the blade and, as shown in Figures III and V, the overhanging portions 34 of the scrapers extend only to a point near to the teeth and extended portions 35 of the deflectors are spaced at 36 closely adjacent to but not in contact with the teeth.

The deflectors 31 and the scrapers 32 may be removed as a unit by spreading the resilient member 33 and slipping the deflectors and the scrapers out of the guides 30. The removed unit is illustrated in Figure V. The shield 24, after the unit and the thrust bearing 27 are removed, appears as illustrated in Figure IV. The entire blade cleaning unit 23 may be removed from the machine in one piece by removing the thumb screw 26 (Figure II). By constructing a blade scraping mechanism that has scrapers 32 which are both resiliently biased and laterally slidable with respect to the sides of the blade 12, the adverse effect of creating too much pressure on one side of the blade 12 during any sidewise movement of the blade is avoided.

Regardless of the amount of care taken in sharpening and setting the teeth of a band saw blade, the set of the teeth and the way the blade is sharpened may cause the blade to lead at an angle as it passes through meat and bone being cut. Naturally, this lead causes the blade to move sideways. It is therefore desirable, from the standpoint of lengthening the life of the blade, to permit sidewise movement of the blade. The blade 12 is flexibly mounted in the slotted guide 20 (Figure I) to permit sidewise movement and in the slot 28 in the shield 24, as hereinbefore mentioned, to permit sidewise movement in the blade cleaning unit 23. The scrapers 32 and the deflectors 31 are mounted to move as one for lateral sliding movement toward and away from the sides of the blade 12 so as to float with the blade while at least the scrapers remain in constant contact with the web 21 of the blade during sidewise movement of the blade.

In the operation of the blade cleaning unit 23, the downwardly moving web 21 of the blade 12 is scraped by the scrapers 32 which are slanted downwardly relative to the web and which extend only to a point near to the teeth 22 on the blade. Much of the waste material scraped from the web 21 piles up on top of the scrapers 32 and is directed by the shield 24 into one relatively small area in the compartment 16, which is below the cleaning unit 23, from where it may be easily removed. However, much of the waste material is forced by the scrapers 32 into the teeth 22 on the blade. Apparently, such waste material is in the form of fibrous meat shreds which becomes tightly wrapped around the teeth. Heretofore, the fibrous shreds built up into gobs of waste material which were projected by centrifugal force into space by the moving saw blade at various points along its path of travel.

Much of such waste material, forced by the scrapers 32 into the teeth 22 on the blade, is removed by the resiliently biased deflectors 31 according to the invention. The deflectors 31 are arranged such that the root of a blade tooth reaches the deflectors before the tip of the tooth, i. e., as shown in Figure III, the plane of the deflectors intersects the blade 12 along a line that is intermediate a direction of travel of the blade and a line extending generally parallel to the cutting or leading edge of a blade tooth. The resilient biasing of the deflectors 31 maintains the extended portions 35 of the deflectors closely adjacent teeth on the blade even during sidewise movement of the blade, so that the extended portions, which are opposed to waste material protruding from the teeth 22, intercept and deflect the waste material. The deflected waste material either is projected away from the teeth 22 on the blade into one relatively small area in the compartment 16, which is below the cleaning unit 23, from where it may be easily removed or it piles up on top of the deflectors 31 and the scrapers 32 until it falls over under its own weight and is directed by the shield 24 into said relatively small area in the compartment 16. After passing through the cleaning unit 23, a remarkably clean blade 12 travels on downwardly around the wheel 11 and then upwardly into the saw wheel housing 10.

It will, of course, be understood that various details of construction may be varied over a wide range without departing from the principles of this invention, and it is therefore not the purpose to limit the patent granted hereon otherwise than necessitated by the scope of the appended claims.

Having described the invention, I claim:

1. In a meat cutting band saw, in combination, two vertically spaced and rotatably mounted saw wheels, a continuous band saw blade running on the wheels, a shield that is mounted along the path of movement of the blade and that protects the felly of the blade moving wheel from waste material falling thereupon, there being a slot in the shield through which the blade passes which is wide enough to permit sidewise movement of the blade, a pair of deflectors that are mounted on the shield one on each side of the blade to be laterally slidable toward and away from the sides of the blade, a scraper fixed to each deflector and having a portion overhanging the deflector in the direction of the blade, a resilient member connecting the deflectors and the scrapers to maintain at least the scrapers in contact with the web of the blade, there being a portion of each deflector extending beyond the scraper fixed thereto, said portion being maintained closely adjacent teeth on the saw blade and being positioned so that the root of a tooth reaches the extended portion of the deflector before the tip of the tooth, whereby the waste material protruding from the teeth is intercepted and deflected away from the teeth.

2. The combination according to claim 1 wherein the resilient member has a U-shape, extends around the back edge of the blade, and is arranged to maintain at least the scrapers in constant contact with the sides of the blade during sidewise movement of the blade.

3. A blade cleaning unit for a meat cutting band saw adapted to permit sidewise movement of the blade in the cleaning unit comprising a deflector for each side of the blade, and a scraper fixed to each deflector, there being a portion of each scraper overhanging the deflectors adjacent the blade and there being an extended portion of each deflector that is closely adjacent teeth on the saw blade and that is arranged such that the root of a tooth reaches the extended portion of the deflector before the tip of a tooth, the overhanging portions of the scrapers being resiliently urged by spring means into engagement with the sides of the blade, whereby the overhanging portions of the scrapers scrape and clean the web of the blade and the extended portions of the deflectors intercept and deflect the waste material protruding from the teeth away from the teeth.

4. In a meat cutting band saw having a continuous blade mounted to permit sidewise movement while it is being cleaned, in combination, a pair of fixedly mounted guides, a deflector for each side of the blade, a scraper fixed to each deflector, the deflectors and the scrapers being laterally slidable in the guides, there being a portion of each scraper overhanging the deflectors adjacent the blade and there being an extended portion of each deflector closely adjacent teeth on the blade and arranged such that a root of a tooth reaches the extended portion of the deflector before the tip of a tooth, and a U-shaped resilient member extending around the back edge of the blade and arranged to maintain the overhanging portions of the scrapers in constant contact with the web of the blade and to maintain the extended portions of the deflectors closely adjacent teeth on the blade, whereby the overhanging portions of the scrapers clean the web of the blade and the extended portions of the deflectors intercept waste material protruding from the teeth.

References Cited in the file of this patent
UNITED STATES PATENTS

| | | |
|---|---|---|
| 659,088 | McKenzie | Oct. 2, 1900 |
| 1,494,774 | Davis | May 20, 1924 |
| 1,870,774 | Gaines | Aug. 9, 1932 |
| 1,908,727 | Bleam | May 16, 1933 |
| 2,572,938 | Lasar | Oct. 20, 1951 |
| 2,741,281 | Braun | Apr. 10, 1956 |

UNITED STATES PATENT OFFICE
CERTIFICATE OF CORRECTION

Patent No. 2,807,294 September 24, 1957

James D. Brown

It is hereby certified that error appears in the printed specification of the above numbered patent requiring correction and that the said Letters Patent should read as corrected below.

Column 2, line 32, for "raw" read -- saw --; column 3, line 20, for "shield 24 which" read -- shield 24 in which --.

Signed and sealed this 30th day of December 1958.

(SEAL)
Attest:

KARL H. AXLINE

Attesting Officer

ROBERT C. WATSON
Commissioner of Patents